July 10, 1951 V. A. REAM 2,560,246
WARM AIR RADIANT HEATED BROODER SYSTEM
Filed May 20, 1949 2 Sheets-Sheet 2
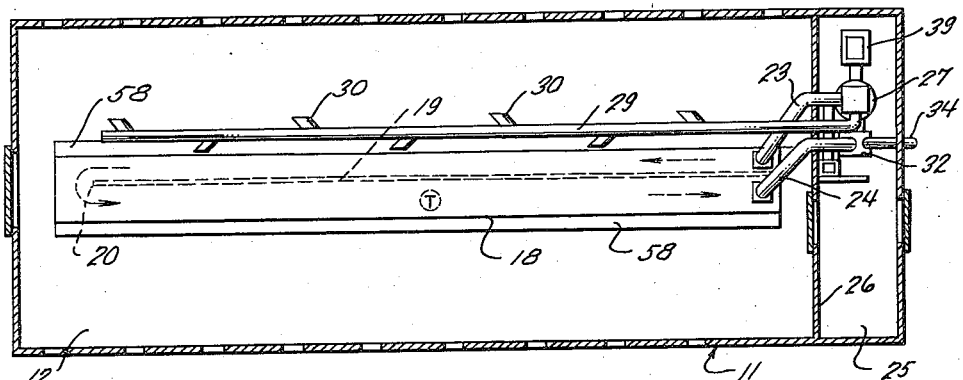
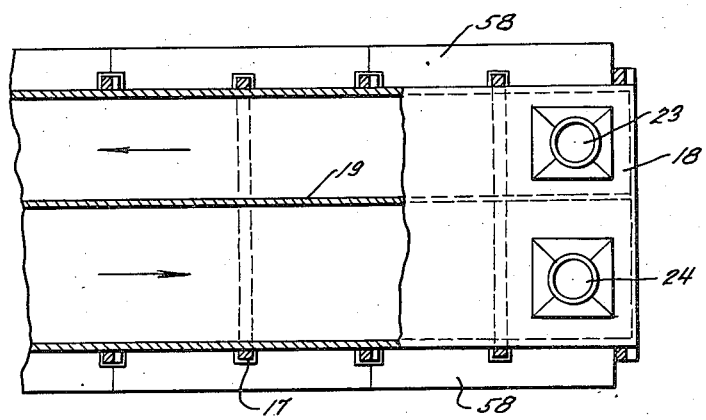
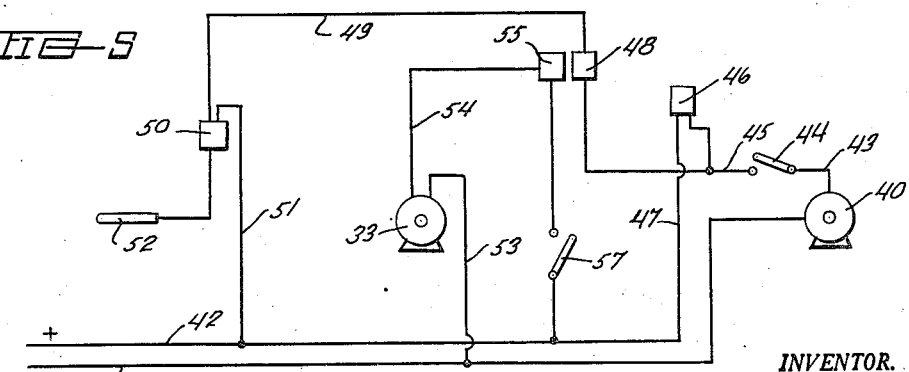
INVENTOR.
Vincent A. Ream
BY
McMorrow, Berman + Davidson
ATTORNEYS
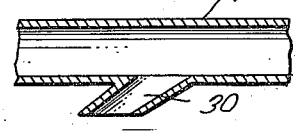

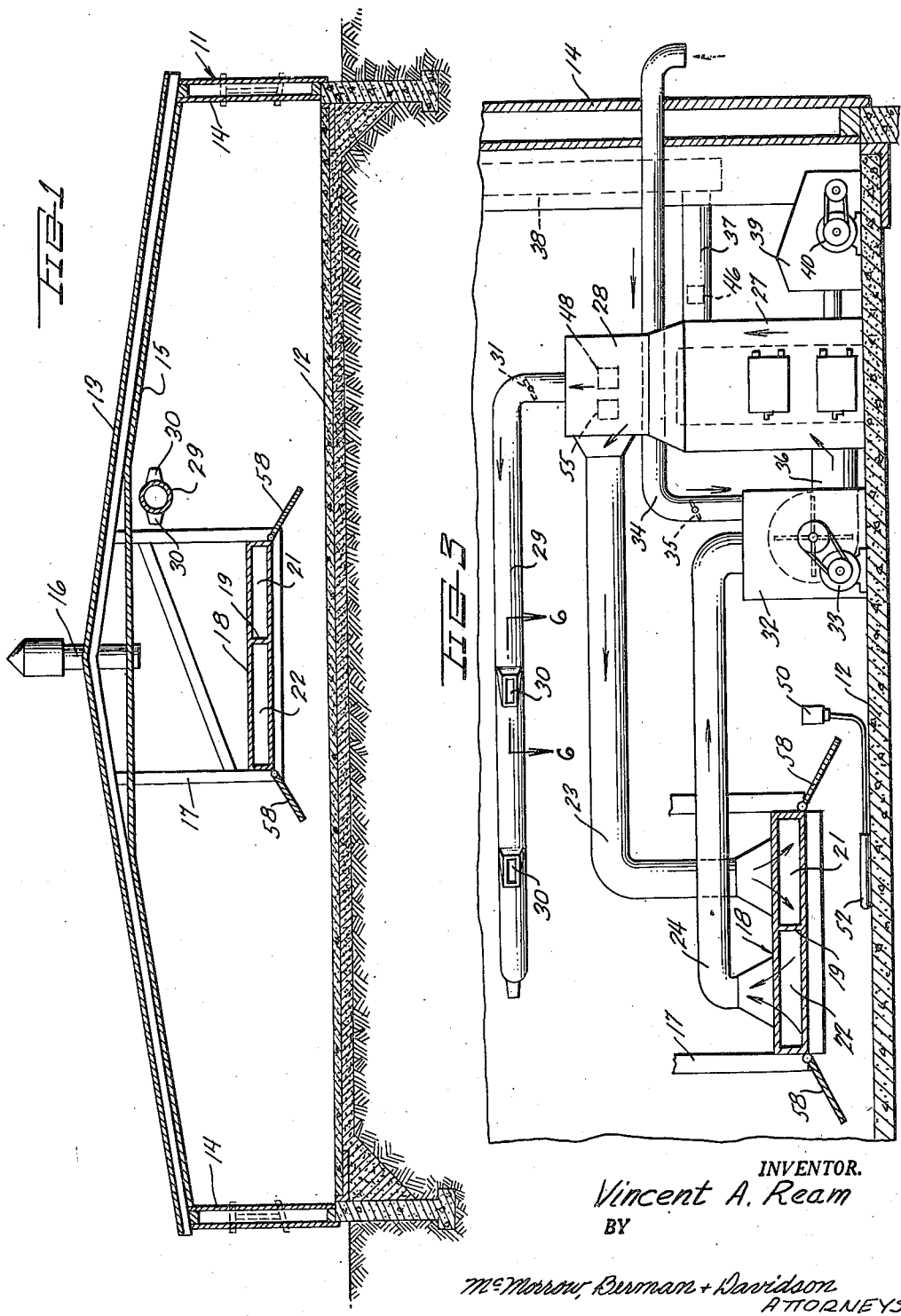

Patented July 10, 1951

2,560,246

UNITED STATES PATENT OFFICE 2,560,246

WARM AIR RADIANT HEATED BROODER SYSTEM

Vincent A. Ream, Greenville, Ohio

Application May 20, 1949, Serial No. 94,438

2 Claims. (Cl. 237—3)

This invention relates to poultry brooder houses and more particularly to a poultry house which is heated by radiant heat.

A main object of the invention is to provide a novel and improved heating and ventilating system for a poultry brooder house wherein suitable conditions are provided for raising poultry on a mass scale during all seasons of the year and wherein suitable heating of the house is obtained even under severe winter conditions.

A further object of the invention is to provide an improved heating and ventilating system of the warm air type for use in poultry brooder houses, said system utilizing radiant heat for heating the floor space of the house and providing ventilation as well as heat, whereby condensation of moisture and frost are avoided.

Further objects and advantages of the invention will become apparent from the following description and claims, and from the accompanying drawings, wherein:

Figure 1 is a transverse vertical cross-sectional view taken through a brooder house provided with a warm air radiant heating and ventilating system constructed in accordance with the present invention.

Figure 2 is a horizontal cross-sectional view taken through the brooder house of Figure 1.

Figure 3 is an enlarged vertical cross-sectional view showing the components of an improved heating and ventilating system for brooder houses according to this invention, the physical arrangement of said components being somewhat different from those shown in Figures 1 and 2.

Figure 4 is a fragmentary top plan view, partly in cross-section, of the warm air radiator employed in the systems of Figures 1, 2 and 3.

Figure 5 is a schematic wiring diagram of the electrical circuit employed for energizing the various electrical components of the systems of Figures 1, 2 and 3.

Figure 6 is an enlarged cross-sectional view taken on line 6—6 of Figure 3.

In the past, the greatest disadvantage and risk in the year round raising of poultry on a mass scale in one brooder house has been the lack of proper even heating and ventilation in the house, especially under severe winter conditions.

The known convection types of heating attempted in large brooder houses have been largely unsuccessful since a warm dry floor, maintained at a temperature as high as 90° at all times is necessary in order to eliminate colds and other diseases common to poultry. In convection systems, that is, heating air by hot water or steam pipe coils or furnaces, a 90° air temperature is needed in order to obtain a 90° floor temperature. This stifling air temperature is very unhealthy for chicks, and creates serious moisture condensation problems. Ninety degree air has a very high moisture saturation point, and when such air comes in contact with colder exterior walls and windows, heavy condensation and frost occurs, even in a well insulated house.

Under such conditions the floor of the house tends to be damp. Ventilation is therefore needed, because when air has reached its saturation point, it will not evaporate any more moisture from the floor and from the poultry droppings thereon. In common practice, ventilation is provided by opening windows in the house or employing large thermostatically controlled ventilating fans. This rids the house of moisture by air change, but also lowers air temperatures rapidly, creating drafts which cause the chicks to catch colds.

In accordance with the present invention, a radiant heat source is employed, suspended above the floor, the heat passing through the air without warming it excessively but warming the floor, whereby the heat loss from the chicks is controlled, even in cool air, and the floor is warmed and dried. Thus the actual air temperature is relatively low as compared to the convection heat commonly used. By keeping the chicks hovered under the radiant heat source, much lower air temperatures are required in the entire brooder house, and consequently a very great saving of fuel is obtained, as well as eliminating high moisture air saturation, and permitting more economical building construction to be employed.

In the system of the present invention, forced warm air is employed as the heating medium. A sealed air panel is suspended a short distance above the floor to obtain maximum radiation effect and the air is continuously recirculated. At the same time, ventilation is provided by introducing cool outside air, heating said air, mixing said air partly with the circulating warm air and distributing the resultant warm dry air through an outlet duct adjacent the ceiling of the house. This warm dry air has a high moisture absorption and extracts moisture from the house. It then escapes through the cracks of the building and through vents which may be provided in the roof. Since no air is removed from the floor for recirculation, and since more air is constantly being forced into the building than it normally contains, drafts are practically eliminated, and moisture removal and ventilation are continuous.

Referring to the drawings, 11 designates a brooder house having a floor 12, a roof 13, supporting walls designated at 14, and a ceiling structure 15. The room 13 may be provided with one or more outlet vents 16, extending through the ceiling structure 15.

Suspended from the roof and ceiling structure of the house is a frame 17 which carries a horizontal, flat elongated duct 18 having an intermediate partition 19 extending longitudinally therein and terminating short of one end of the duct 18, as shown at 20 in Figure 2 forming a pair of sections in side by side relation. Thus, there is defined in duct 18 a forward air flow passage 21 and a return air flow passage 22. Connected to the intake end of passage 21 is an intake conduit 23. Connected to the discharge end of passage 22 adjacent conduit 23 is the discharge conduit 24.

Located in a compartment 25 defined at one end of the house 11 by a partition 26 is a furnace 27 provided with an air jacket leading to a warm air plenum chamber 28, located at the top of furnace 27. Conduit 23 is connected to plenum chamber 28. Also connected to said plenum chamber is a warm air distributing conduit 29 suitably supported in the upper portion of the house and provided with spaced outlet vents 30. Conduit 29 is provided with an adjustable damper 31 adjacent its connection with the plenum chamber 28.

Designated at 32 is a blower or source of air under pressure driven by a motor 33. Discharge conduit 24 is connected to the low pressure side of blower 32. Also connected to said low pressure side is an air intake conduit 34 extending outside the building and open to atmosphere. Conduit 34 is provided with an adjustable damper 35 adjacent the connection of said conduit to blower 32.

The high pressure side of blower 32 is connected by a conduit 36 to the air jacket surrounding furnace 27. The exhaust gas from the furnace is conveyed by a flue 37 to a vertical stack 38.

Fuel is supplied to the furnace by a feeding device or source of fuel under pressure 39 driven by a motor 40.

Referring now to Figure 5, it will be seen that the fuel supply motor 40 is connected to the power lines, shown at 41 and 42 in a conventional manner said motor 40 having a first energizing circuit comprising the line 41, the motor, a terminal wire 43, a manual switch 44, a wire 45, a thermostatic automatic firing switch 46 located in duct 37, and a wire 47 connected to line wire 42. Said motor has a second energizing circuit from wire 45 through the furnace air temperature limit switch 48 located in plenum chamber 28, a wire 49, a floor temperature control switch 50, and a wire 51, connected to line wire 42. Switch 50 is controlled by a bulb-type temperature-sensitive element 52, located beneath the radiator 18 on the floor 12.

The blower motor 33 has an energizing circuit comprising line wire 41, a wire 53, the motor 33, a wire 54, a thermostat switch 55 located in the plenum chamber 28, and a wire 56 connected to line wire 42 through a manual switch 57.

In operation, air is circulated through the circuit comprising plenum chamber 28, conduit 23, radiator 18, conduit 24, blower 32 and the air jacket around furnace 27. Cool outside air enters the circuit from intake conduit 34 at the low pressure side of blower 32. Warm dry air is discharge from the circuit through the vents 30 in ventilating conduit 29. Heat is radiated from radiator 18 downwardly onto the floor, providing a warm floor space beneath the radiator in which chicks may be kept warm and dry even under severe winter conditions. The radiator is provided with the hinged metal hovers 58, 58 at the side margins thereof to retard movement of air beneath the radiator. The young chicks will confine themselves to the area beneath the radiator until they are sufficiently feathered to withstand lower building temperatures.

Furnace 27 is conventional in design and is refueled automatically by the feed device 39. The air blower 32 is of substantial capacity so as to be able to move a substantial volume of air against static pressures such as are created by the resistance of the furnace, duct work, radiator 18, etc.

When fire is started in the furnace, the air temperature rise in plenum chamber 28 causes switch 55 to close and start blower motor 33. Blower 32, when started, creates a partial vacuum within its casing by exhausting air therefrom and from return conduit 24. The air moving through the jacket around furnace 27 is warmed rapidly and is forced through plenum chamber 28 into conduit 23 leading to radiator 18. The warm air circulates through forward passage 21 and returns to conduit 24 through passage 22. The air is then forced by blower 32 into the furnace jacket for reheating.

By the above described system, the fowl are kept at comfortable body heat by consequence of the warm surfaces above and below, and are kept at normal air temperatures much lower than the warm floor temperature. The top surface of the radiator 18 is preferably insulated to reduce convection losses from the radiator, the hover plates 58, 58 serving to retard air movement under the radiator, as above described.

Moisture in the house is removed by introducing quantities of warm dry air therein through the vents 30. Said warm dry air absorbs moisture from the floor and other surfaces in the house. Since a large volume of air is constantly being forced into the house and none is being removed by mechanical means, a slight pressure is built up within the house which causes a continuous outward flow of air from the building through cracks normally present around the windows and doors, as well as through the roof vents 16. The volume of warm dry air introduced, and accordingly the rate of air change, may be controlled by the dampers 31 and 35.

The radiator 18 may be located either lengthwise of the building, as shown in Figures 1 and 2, transverse to the building, as shown in Figures 3, or in any other desired position. The radiator is preferably mounted about two feet above the floor. This height is sufficient to provide easy access to the floor for cleaning, and space enough for the grown fowl to use the floor space under the panel, and roosting space on top of the radiator, without requiring excessively high temperature of the radiator for brooding.

To maintain a constant, fairly even floor temperature, the thermostatically controlled switch 50 is placed in series with the power source and the fuel feeding motor 50. The control device 52 of switch 50 may be of any type that opens switch contacts upon temperature rise and closes said contacts on temperature drop. The device 52 is placed on the floor surface under the radiator. When the floor temperature has risen to the desired temperature, of perhaps a 90° setting, the contacts of switch 50 will open and break the electrical circuit activating the firing device 40, and consequently no additional heating is provided or fuel consumed. When the floor temperature falls the contacts close and the refueling device is activated as long as necessary to raise the floor temperature to 90° again. Since it is evident that when the floor is cold it will take some time for the floor to rise to the desired temperature, and will rise much more slowly than the firing device can build up the furnace temperature, a safety control is needed to prevent overheating of the furnace and associated hazards of fire and damage to the equipment.

A limit control 48 is placed in the plenum chamber 28 which opens the activating circuit of fuel supply motor 40 upon air temperature rise and closes said circuit on temperature fall. Whenever furnace air temperature rises to a danger point, the circuit opens and discontinues refueling until the furnace air temperature drops to a safe value.

The blower motor 33 is automatically controlled by thermostatic switch 55. The blower motor is energized only when the air temperature in plenum chamber 28 is above a predetermined value, and is independent of the remaining elements of the system.

Additional features may be added, as deemed necessary in regard to controls or methods of control. Automatic spray humidifiers may be used by introducing a controlled water spray into the blower casing 32 or ventilating duct 29, in order to raise the air humidity in case of too low humidity while the chicks are only a few days old. On extremely long radiators, booster blowers may be added to lessen the load on blower motor 33 and to help overcome resistance beyond the practical capacity limit of one blower.

Furthermore, by providing outlets, having suitable closures, in the sides of the radiator 18, the radiator becomes a ventilating duct for the distribution of large volumes of fresh outdoor air, as for summer ventilation, for the drying of the litter beneath the radiator and the healthful ventilation of the poultry in the summer time. This is accomplished by removing side access panels of the blower casing to admit fresh outside air and operating the blower without operating the furnace.

The above described heating and ventilating system is also suitable for use in the brooding of any type of bird or fowl, as well as animals, such as pigs and lambs.

While a specific embodiment of a heating and ventilating system for a poultry brooding house has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a brooder house having a floor and a roof, a heating and ventilating system disposed within said brooder house and operatively connected thereto, said system comprising a vertically disposed furnace arranged within said house and secured to said floor for burning fuel under pressure and generating heat, a jacket disposed about and surrounding said furnace, a plenum chamber positioned on top of said jacket and in communication with the latter, a horizontally disposed radiator extending longitudinally of said house and positioned adjacent to and spaced from said floor of said house and dependingly supported from said roof, a source of fuel under pressure disposed within said house and operatively connected to said furnace, a source of air under pressure disposed within said house, a conduit having one end in communication with said air source and having the other end in communication with said jacket adjacent the lower end thereof for conveying the air under pressure to said jacket, a second conduit having one end in communication with said air source and having the other end extending exteriorly of said house and in communication with the atmosphere for conveying fresh air to said air source, a third conduit extending longitudinally of said house adjacent to and spaced from said roof and having one end in communication with said plenum chamber, said third conduit being provided with a plurality of outlet vents spaced therealong, a fourth conduit having one end in communication with said plenum chamber, a fifth conduit having one end in communication with said air source, said radiator including a pair of sections arranged in side by side relation and defining together a pair of longitudinally extending passages, said passages being in communication with each other adjacent one end, the other end of one of said passages being in communication with the other end of said fourth conduit, the other end of the other of said passages being in communication with the other end of said fifth conduit, and a thermosensitive control element resting upon said floor of said house beneath said radiator and operatively connected to said fuel source for controlling the admission of fuel to said furnace.

2. In a brooder house having a floor and a roof, a heating and ventilating system disposed within said brooder house and operatively connected thereto, said system comprising a vertically disposed furnace arranged within said house and secured to said floor for burning fuel under pressure and generating heat, a jacket disposed about and surrounding said furnace, a plenum chamber positioned on top of said jacket and in communication with the latter, a horizontally disposed radiator extending longitudinally of said house and positioned adjacent to and spaced from said floor of said house and dependingly supported from said roof, opposed hovers projecting from the sides of said radiator and dependingly supported therein for retarding the flow of air from beneath the radiator, a source of fuel under pressure disposed within said house and operatively connected to said furnace, a source of air under pressure disposed within said house, a conduit having one end in communication with said air source and having the other end in communication with said jacket adjacent the lower end thereof for conveying the air under pressure to said jacket, a second conduit having one end in communication with said air source and having the other end extending exteriorly of said house and in communication with the atmosphere for conveying fresh air to said air source, a third conduit extending longitudinally of said house adjacent to and spaced from said roof and having one end in communication with said plenum chamber, said third conduit being provided with a plurality of outlet vents spaced therealong, a fourth conduit having one end in communication with said plenum chamber, a fifth conduit having one end in communication with said air source, said radiator including a pair of sections arranged in side by side relation and defining together a pair of longitudinally extending passages, said passages being in communication with each other adjacent one end, the other end of one of said passages being in communication with the other end of said fourth conduit, the other end of the other of said passages being in communication with the other end of said fifth conduit, and a thermosensitive control element resting upon said floor of said house beneath said radiator and operatively connected to said fuel source for controlling the admission of fuel to said furnace.

VINCENT A. REAM.

REFERENCES CITED

The following references are of record in the file of this patent:

UNITED STATES PATENTS

| Number | Name | Date |
|---|---|---|
| 1,018,714 | Koons | Feb. 27, 1912 |
| 1,421,315 | Sheer | June 17, 1922 |
| 1,780,052 | Wariner | Oct. 28, 1930 |
| 2,039,673 | Williams | May 5, 1936 |

FOREIGN PATENTS

| Number | Country | Date |
|---|---|---|
| 367,002 | Great Britain | Feb. 4, 1932 |